J. F. LE BARON.
TREAD FOR TIRES.
APPLICATION FILED MAR. 27, 1913.

1,078,153.

Patented Nov. 11, 1913.

John F. Le Baron,
Inventor

Witnesses by C. A. Snow & Co.
Attorneys

UNITED STATES PATENT OFFICE.

JOHN FRANCIS LE BARON, OF CHARDON, OHIO.

TREAD FOR TIRES.

1,078,153.   Specification of Letters Patent.   Patented Nov. 11, 1913.

Application filed March 27, 1913. Serial No. 757,241.

*To all whom it may concern:*

Be it known that I, JOHN FRANCIS LE BARON, a citizen of the United States, residing at Chardon, in the county of Geauga and State of Ohio, have invented a new and useful Tread for Tires, of which the following is a specification.

The device forming the subject matter of this application is an auxiliary tread adapted to be applied to a vehicle tire, for the purpose of preventing the wheel from cutting into the soil, the device being intended, primarily, to permit an automobile or other vehicle to be used upon the yielding sands of the sea-side or upon like unstable soils.

The invention aims to provide a tread of the sort described, which may be fashioned at small expense, the tread being so constructed that it may be readily attached to a vehicle wheel.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
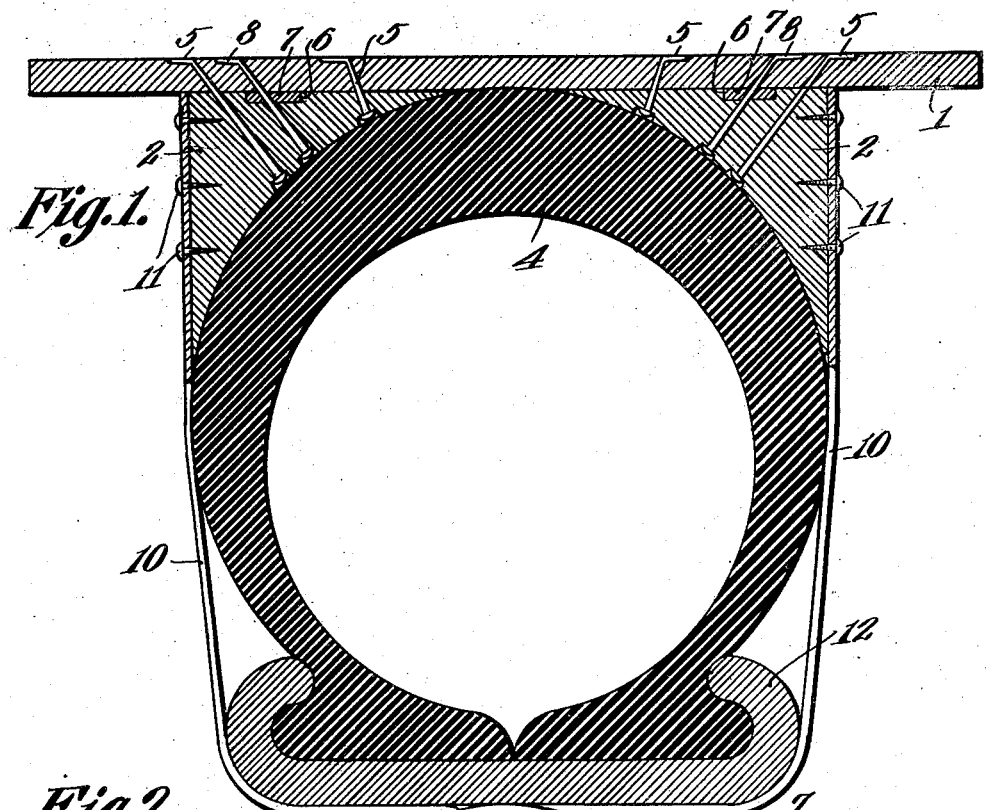
Figure 2:
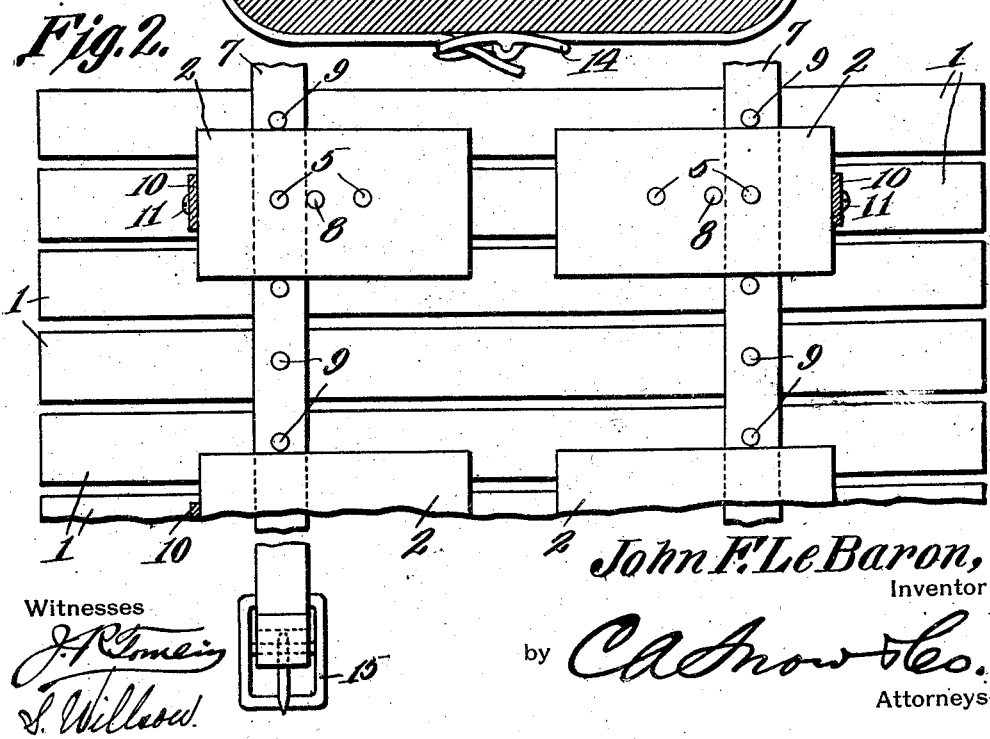

In the drawing:—Figure 1 shows the invention in transverse section, applied to a vehicle tire; and Fig. 2 shows the invention in fragmental bottom plan.

The tread herein disclosed comprises a plurality of slats 1, preferably, although not necessarily fashioned from hickory, or another tough wood, although obviously, metal may be employed in the making of the slats 1 if desired. The slats 1 are preferably disposed in parallel relation and are spaced slightly apart. Certain of the slats 1 are connected by braces 2 of approximately triangular form, the inner faces of the braces 2 being rounded so as to conform to the periphery of the tire 4. The tire 4, it is to be understood, represents merely the periphery of the wheel, whatever may be the form thereof. Securing elements 5 unite the braces 2 with the slats 1 which lie upon the braces.

The braces 2 may be recessed in their tread or outer portions as indicated at 6, to receive straps 7, there being securing elements 8 passing through the braces 2 and the straps 7 and into certain of the slats 1. Those slats 1 which lie between the braces 2 are assembled with the straps 7 by means of securing elements 9. A securing device such as a pair of straps 10, is secured by screws 11 or otherwise to the braces 2, the straps 10 being extended beneath the rim 12 and being connected by a buckle 14.

In practice, the entire circumference of the tire 4 is surrounded by the tread above described, the straps 7 at one end being provided with buckles 15 or like elements, whereby the shield may be held in annular form around the periphery of the tire 4. The slats 1 at their ends extend beyond the sides of the tire 4, and a wide tread is thereby afforded, the construction being such that the vehicle may be run upon soft earth, without causing the wheels of the vehicle to sink into the earth.

When the occasion for the use of the tread has passed, the same may be disposed in a compact roll and may be housed in small compass.

Having thus described the invention, what is claimed is:—

1. An auxiliary tread for a vehicle wheel comprising a plurality of slats; circumferentially spaced wheel engaging brace blocks assembled with certain of the slats only; and a connection between all of the slats.

2. An auxiliary tread for a vehicle wheel comprising a plurality of slats; pairs of circumferentially spaced wheel engaging brace blocks assembled with certain of the slats only; and wheel engaging means connected with the blocks of each pair independently of the slats.

3. An auxiliary tread for a vehicle wheel, comprising a plurality of slats; wheel-engaging braces mounted on certain of the slats; a flexible element extended transversely of the slats and located between the braces and the slats; and securing elements uniting the braces, the flexible element, and the brace carrying slats.

4. An auxiliary tread for a vehicle wheel, comprising wheel-engaging braces, each having a recess in its tread portion; a flexible element located in the recesses; and slats, certain of which are secured to the flexible element, others of which are secured to the braces to hold the flexible element in the recesses.

In testimony that I claim the foregoing as my own, I have hereto affixed my signature in the presence of two witnesses.

JOHN FRANCIS LE BARON.

Witnesses:
George R. Harrison,
Mabel L. Wilmot.

Copies of this patent may be obtained for five cents each, by addressing the "Commissioner of Patents, Washington, D. C."